(12) United States Patent
Sakuramoto et al.

(10) Patent No.: US 7,046,912 B2
(45) Date of Patent: May 16, 2006

(54) REPRODUCING APPARATUS AND REPRODUCING/RECORDING APPARATUS MEMORIZING IDENTIFICATION INFORMATION OF OPTICAL INFORMATION MEDIA AND METHOD THEREOF

(75) Inventors: Yukari Sakuramoto, Yokohama (JP); Tamotsu Ito, Ayase (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/145,811

(22) Filed: May 16, 2002

(65) Prior Publication Data

US 2002/0126992 A1 Sep. 12, 2002

Related U.S. Application Data

(63) Continuation of application No. 09/221,148, filed on Dec. 28, 1998, now Pat. No. 6,393,201.

(30) Foreign Application Priority Data

Jan. 7, 1998 (JP) .................................. 10-001520

(51) Int. Cl.
H04N 5/91 (2006.01)
(52) U.S. Cl. ............................ 386/69; 386/95; 386/125
(58) Field of Classification Search .................. 386/46, 386/95, 125, 111, 112, 126, 69; 369/30.24; 360/72.1
See application file for complete search history.

(56) References Cited

U.S. PATENT DOCUMENTS

| 4,872,067 A | | 10/1989 | Okatani | |
|---|---|---|---|---|
| 4,879,705 A | * | 11/1989 | Aoyagi et al. | 369/30.14 |
| 5,365,502 A | * | 11/1994 | Misono | 369/18 |
| 5,598,391 A | * | 1/1997 | Mukawa | 369/53.37 |
| 5,654,946 A | * | 8/1997 | Kim et al. | 360/72.1 |
| 5,974,008 A | * | 10/1999 | Lee | 369/30.36 |

FOREIGN PATENT DOCUMENTS

| JP | 59-195391 | | 11/1984 |
|---|---|---|---|
| JP | 60-052986 | | 3/1985 |
| JP | 62-061057 | | 4/1987 |
| JP | 02-078054 | | 3/1990 |
| JP | 6-090864 | | 4/1994 |
| JP | 09-219086 | * | 8/1997 |
| JP | 09219086 A | * | 8/1997 |

* cited by examiner

Primary Examiner—Huy Nguyen
(74) Attorney, Agent, or Firm—Antonelli, Terry, Stout and Kraus, LLP.

(57) ABSTRACT

A reproducing apparatus and method for recording/reproducing record information to perform an information recording medium. A drive is provided for recording/reproducing recorded information to/from the information recording medium, and a non-volatile memory memorizes an identifier of the information recording medium loaded on the drive and position information indicative of a position on the information recording medium where the drive records/reproduces the information therefrom. The position information is renewed at one of a predetermined time and a predetermined period.

10 Claims, 13 Drawing Sheets

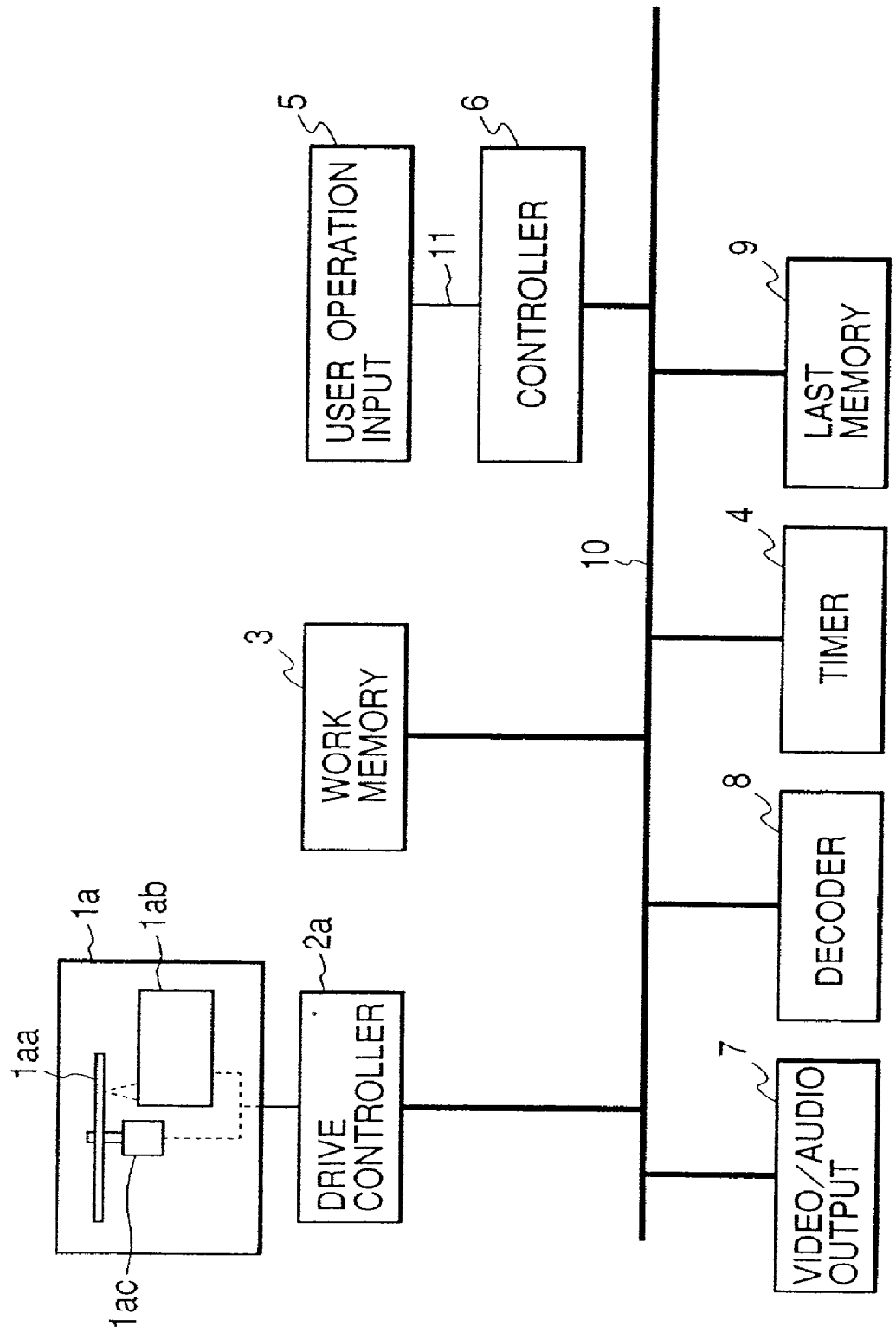

FIG. 2

| ADDRESS | CONTENTS |
|---|---|
| 000 | MANAGEMENT NO. 0 |
| 001 | KIND OF MEDIUM |
| 002 | DISC ID |
| 003 | |
| 004 | |
| 005 | |
| 006 | VIDEO INFORMATION |
| 007 | CAPTION |
| 008 | AUDIO, KARAOKE |
| 009 | TITLE NO. |
| 00A | CHAPTER NO. |
| 00B | REPRODUCTION INTERRUPTION POSITION |
| 00C | SAMPLING POSITION INFORMATION |
| 00D | (VIDEO REPRODUCTION POSITION INFORMATION) |
| 00E | OR LAST POSITION INFORMATION |
| 00F | KIND OF TV, OSD POSITION |
| 010 | AUDIO OUTPUT POSITION |
| 011 | FL SOUND VOLUME |
| 012 | FR SOUND VOLUME |
| 013 | SL SOUND VOLUME |
| 014 | SR SOUND VOLUME |
| 015 | CENTER SOUND VOLUME |
| 016 | SUB-WOOFER SOUND VOLUME |
| 017 | AUTOMATIC REPRODUCTION |
| 018 | OSD MENU LANGUAGE |
| 019 | DISC MENU LANGUAGE |
| 01A | DRC |
| 01B | SCREEN, BACKGROUND COLOR |
| 01C | PARENTAL LEVEL |
| 01D | OPTICAL DIGITAL OUTPUT |
| 01E | BRIGHTNESS OF DISPLAY |
| 01F | CHECK SUM |
| ⋮ | ⋮ |
| ⋮ | ⋮ |
| 7EE | PARENTAL IDENTIFICATION NO. |
| 7EF | |

64 BLOCKS

FIG. 9

| ADDRESS (Hex) | SIZE (byte) | CONTENTS |
|---|---|---|
| 00 | 16 | DISC ID |
| 10 | 1 | MANAGEMENT NO. 0 |
| 11 | 1 | KIND OF MEDIUM |
| 12 | 2 | LAST POSITION (sec) |
| 14 | 4 | MANAGEMENT NO. 1 |
| 18 | 1 | ASPECT, NTSC/PAL |
| 19 | 1 | CAPTION |
| 1A | 1 | AUDIO, KARAOKE |
| 1B | 1 | TITLE NO. 1 |
| 1C | 1 | CHAPTER NO. |
| 1D | 1 | TITLE NO. 2 |
| 1E | 2 | CRC |

FIG. 10

| ADDRESS (Hex) | SIZE (byte) | CONTENTS |
|---|---|---|
| 7DB | 1 | KIND OF TV, OSD POSITION |
| 7DC | 1 | AUDIO OUTPUT POSITION |
| 7DD | 1 | FL SOUND VOLUME |
| 7DE | 1 | FR SOUND VOLUME |
| 7DF | 1 | SL SOUND VOLUME |
| 7E0 | 1 | SR SOUND VOLUME |
| 7E1 | 1 | CENTER SOUND VOLUME |
| 7E2 | 1 | SUB-WOOFER SOUND VOLUME |
| 7E3 | 1 | AUTOMATIC REPRODUCTION |
| 7E4 | 1 | OSD MENU LANGUAGE |
| 7E5 | 2 | DISC MENU LANGUAGE |
| 7E7 | 1 | DRC |
| 7E8 | 1 | SCREEN SAVER, BACKGROUND COLOR |
| 7E9 | 1 | PARENTAL LEVEL |
| 7EA | 1 | OPTICAL DIGITAL OUTPUT |
| 7EB | 1 | BRIGHTNESS OF DISPLAY |
| 7EC | 1 | STILL VIDEO FORMAT |
| 7ED | 1 | PARENTAL PASSWORD |
| 7EE | 2 | PARENTAL ID NO. |

FIG. 12

|  | | | | |
|---|---|---|---|---|
| | DISC ID 8 | MANAGEMENT NO. 1 | 5 | ─ 1204 |
| P13 → | DISC ID 33 | MANAGEMENT NO. 1 | 1 | ─ 1203 |
| P14 → | NON-USED AREA | MANAGEMENT NO. 1 | xxx | |
| | ⋮ | | | |
| | NON-USED AREA | MANAGEMENT NO. 1 | xxx | |
| P1 → | DISC ID 33 | MANAGEMENT NO. 0 | 21 | |
| P2 → | DISC ID 33 | MANAGEMENT NO. 0 | 22 | |
| P3 → | DISC ID 33 | MANAGEMENT NO. 0 | 23 | |
| P4 → | DISC ID 33 | MANAGEMENT NO. 0 | 24 | ─ 1202 |
| P5 → | DISC ID 8 | MANAGEMENT NO. 0 | 14 | |
| P6 → | DISC ID 8 | MANAGEMENT NO. 0 | 15 | |
| P7 → | DISC ID 8 | MANAGEMENT NO. 0 | 16 | |
| P8 → | DISC ID 8 | MANAGEMENT NO. 0 | 17 | |
| P9 → | DISC ID 8 | MANAGEMENT NO. 0 | 18 | |
| P10 → | DISC ID 8 | MANAGEMENT NO. 0 | 19 | |
| P11 → | DISC ID 33 | MANAGEMENT NO. 0 | 20 | |

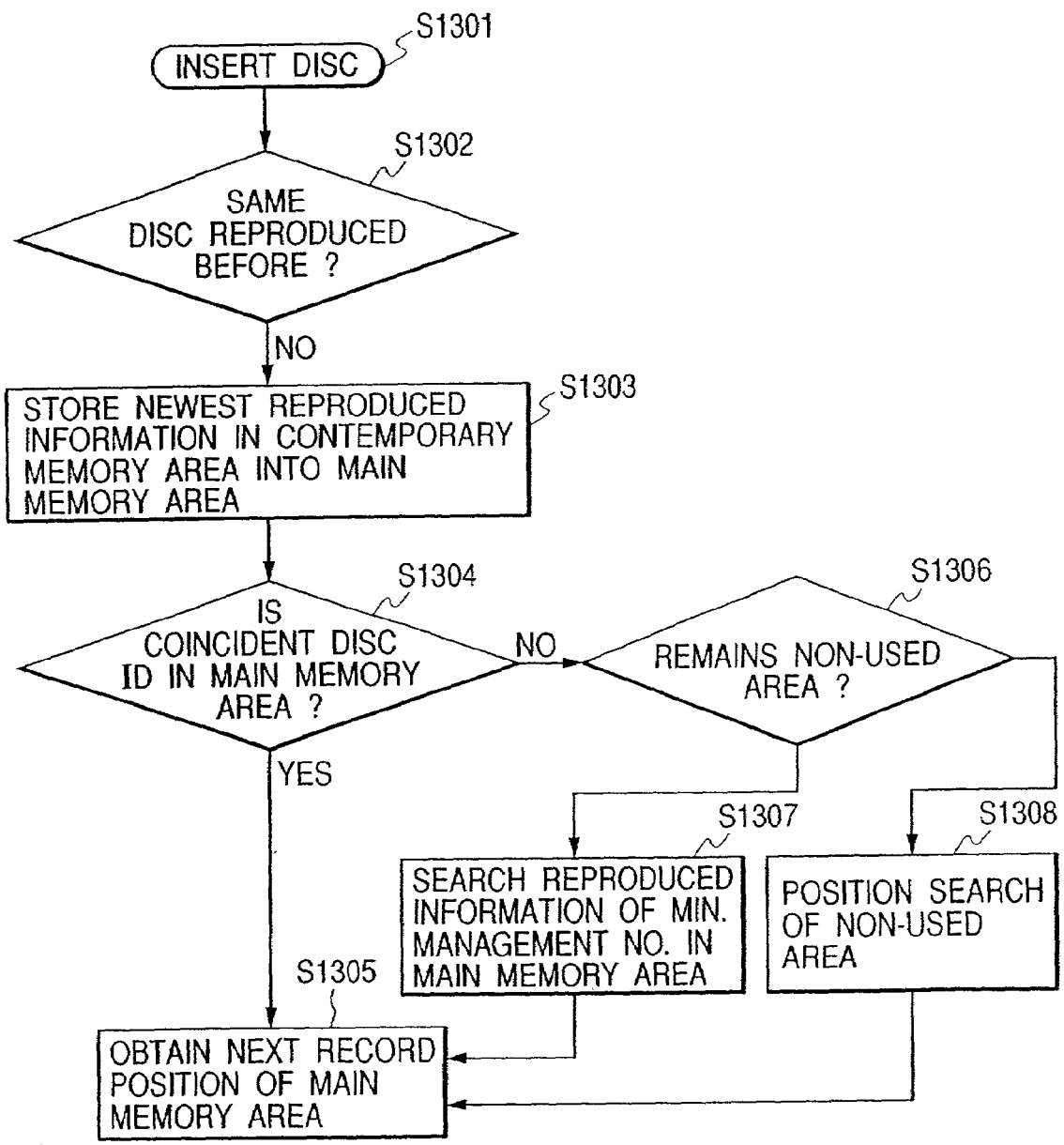

FIG. 14

| | | |
|---|---|---|
| DISC ID 8 | MANAGEMENT NO. 1 | 5 |
| DISC ID 33 | MANAGEMENT NO. 1 | 6 |
| NON-USED AREA | MANAGEMENT NO. 1 | xxx |
| ⋮ | | |
| NON-USED AREA | MANAGEMENT NO. 1 | xxx |
| DISC ID 33 | MANAGEMENT NO. 0 | 21 |
| DISC ID 33 | MANAGEMENT NO. 0 | 22 |
| DISC ID 33 | MANAGEMENT NO. 0 | 23 |
| DISC ID 33 | MANAGEMENT NO. 0 | 24 |
| DISC ID 16 | MANAGEMENT NO. 0 | 25 |
| DISC ID 16 | MANAGEMENT NO. 0 | 26 |
| P1 → DISC ID 16 | MANAGEMENT NO. 0 | 27 |
| P2 → DISC ID 8 | MANAGEMENT NO. 0 | 17 |
| DISC ID 8 | MANAGEMENT NO. 0 | 18 |
| DISC ID 8 | MANAGEMENT NO. 0 | 19 |
| DISC ID 16 | MANAGEMENT NO. 0 | 20 |

1401 (top section), 1402 (bottom section)

REPRODUCING APPARATUS AND REPRODUCING/RECORDING APPARATUS MEMORIZING IDENTIFICATION INFORMATION OF OPTICAL INFORMATION MEDIA AND METHOD THEREOF

CROSS REFERENCE TO RELATED APPLICATION

This is a continuation of U.S. application Ser. No. 09/221,148, filed Dec. 28, 1998, now U.S. Pat. No. 6,393,201 the subject matter of which is incorporated by reference herein.

BACKGROUND OF THE INVENTION

1. Field of the Invention

The present invention relates to a reproducing apparatus of information recording media, in particular, optical information recording medium such as an optical disc (i.e., a so-called "Digital Video Disc", etc., into which digital video/audio information can be recorded, and also to a recording/reproducing apparatus of information recording media, including such optical information recording media such as a DVD-RAM (i.e., a so called Digital Video Disc-Random Access Memory), etc.

2. Description of Prior Art

In Japanese Patent Laying-Open No. Hei 9-219086 (1997), there is disclosed or described an example of a conventional reproducing apparatus of an optical disc.

The optical disc reproducing apparatus of the conventional art has a function of detecting an identifier which is an inherent information for each of the optical discs and obtainable from the data of the recorded information thereof so as to identify it, and a function, a so-called "last memory" function for memorizing position information of the optical disc, whereby the video/audio information is recorded into a last memory together with it, when a last memory instruction key is pushed down.

In such the reproducing apparatus of the optical disc, after being mounted or set with an optical disc therein, the identifier of the optical disc is detected and decided whether to be coincident with that which is memorized into the last memory or not. In a case where it is detected that they are coincident to each other, then the reproduction is started from a continuous reproducing position upon an instruction for reproduction generated from the last memory on/off operation key, while the reproduction is started from an original starting position or beginning if there is no such the starting instruction for the reproduction from the last memory on/off operation key. Further, if it is impossible to detect the fact that they are coincident to each other, the reproduction is started from the original starting position (i.e., from the beginning) with regardless of the operation on the last-memory on/off operation key.

However, in such the conventional art, the position information of the optical disc recording the video/audio information therein, at the time when the last memory instruction key is pushed down, is memorized into the last memory together with the identifier information, upon the operation of the last memory instruction key, therefore there is not guarantee that the identifier information and the position information of the disc at which the reproduction is made are certainly memorized into the last memory in any occasion.

For instance, if the power supply is abruptly turned OFF (i.e., interrupted) or is cut off (i.e., stopped) under bad condition of electric power supply source, further, if a power bottom is erroneously turned CFF because of forgetting the operation of the above last memory instruction key, the identifier information and the position information of the disc at which the reproduction is made are lost. Therefore, there is a problem that the continuous reproduction cannot be obtained even if the power source including power supply is turned ON again.

SUMMARY OF THE INVENTION

A first object of the present invention is, for dissolving the above-mentioned problem, to provide a reproducing apparatus of information recording media, in particular, an optical information recording medium, and a method thereof, whereby the continuous reproduction can be immediately done when the power source including power supply is turned ON again, even in the case where the power supply was abruptly turned OFF or is cut off under such the bad condition of the electric power supply source, and further in the case where the power button is erroneously turned OFF without operation of the above last memory instruction key.

A second object of the present invention is to provide a reproducing apparatus of information recording media, in particular, an optical information recording medium, whereby the reproduction can be done continuously from the reproduction interruption position, or from the beginning of a title, a chapter or a disc, at the user's selection when the power source including power supply is turned ON again, even in the case where the power supply is abruptly turned OFF or is cut off under such the bad condition of the electric power supply source, and further in the case where the power button is erroneously turned OFF without the operation of the above last memory instruction key.

A third object of the present invention is to provide a reproducing apparatus of information recording media, in particular, an optical information recording medium, whereby the continuous reproduction can be done with maintaining the same condition as before when the power source including power supply is turned ON again, even in the case where the power supply is abruptly turned OFF or is cut off under such the bad condition of the electric power supply source, and further in the case where the power button is erroneously turned OFF without operation of the above last memory instruction key.

A fourth object of the present invention is to provide a recording/reproducing apparatus of information recording media, in particular, an optical information recording medium, whereby continuous recording of input data can be done immediately when the power source including power supply is turned ON again, even in the case where the power supply is abruptly turned OFF or is cut off under such the bad condition of the electric power supply source.

A fifth object of the present invention is to provide a recording/reproducing apparatus of information recording media, in particular, an optical information recording medium, whereby continuous recording of input data can be done immediately with maintaining the same condition as before when the power source including power supply is turned ON again, even in the case where the power supply is abruptly turned OFF or is cut off under such the had condition of the electric power supply source.

According to the present invention, for achieving the first object mentioned above, there is provided a reproducing apparatus of an information recording medium, comprising:

a drive for reading out information recorded onto the information recording medium;

a drive controller portion for controlling said drive so as to extract video/audio data from the recorded information by reproducing thereof, and having a function of identifying said information recording medium which is mounted onto said drive by detecting an identifier information from data in the recorded information;

video/audio output portion for outputting video/audio;

a work memory for memorizing the identifier information being identified in said drive controller portion, the video/audio data being extracted in said drive controller portion, and information indicative of reproducing position;

a decoder portion for reading out the video/audio data memorized in said work memory and for converting the read-out video/audio data into desired video/audio data to be outputted to said video/audio output portion;

an interruption instruction means for outputting an interruption instruction at a desired time period or frequency;

a non-volatile memory; and a controller portion for controlling the identifier information and the information indicative of the reproducing position which are memorized in said work memory so as to be read out and to be stored into said non-volatile memory upon basis of the interruption instruction outputted at the desired time period or frequency from said interruption instruction means.

According to the present invention, for achieving the second object mentioned above, there is provided a reproducing apparatus of an information recording medium, comprising:

a drive for reading out information recorded onto the information recording medium;

a drive controller portion for controlling said drive so as to extract video/audio data from the recorded information by reproducing thereof, and having a function of identifying said information recording medium which is mounted onto said drive by detecting an identifier information from data in the recorded information;

video/audio output portion for outputting video/audio;

a work memory for memorizing the identifier information being identified in said drive controller portion, the video/audio data being extracted in said drive controller portion, and information indicative of reproducing position;

a decoder portion for reading out the video/audio data memorized in said work memory and for converting the read-out video/audio data into desired video/audio data to be outputted to said video/audio output portion;

an interruption instruction means for outputting an interruption instruction at a desired time period or frequency;

a non-volatile memory;

selection means for selecting whether the position of the reproduction to be started from a continuous reproducing position again or not when conducting the reproduction anew; and a controller portion for controlling the identifier information and the information indicative of the reproducing position which are memorized in said work memory so as to be read out and to be stored into said non-volatile memory upon basis of the interruption instruction outputted at the desired time period or frequency from said interruption instruction means, and for controlling the reproduction from the continuous reproducing position by controlling said drive controller portion upon basis of the information indicative of the reproducing position which is read out from said non-volatile memory when conducting the reproduction anew, in a case where the identifier information read out from said non-volatile memory and the identifier information identified in said drive controller portion is compared to be coincident with and the reproduction from the continuous reproducing position is selected by said selection portion.

According to the present invention, for achieving the third object mentioned above, there is provided a reproducing apparatus of an information recording medium, as defined in the above, wherein said decoder portion reads out the video/audio data stored in said work memory, and converts the read-out video/audio data into desired video/audio data to be outputted to said video/audio output portion, and further outputs the information indicative reproducing position with respect to said information recording medium; and said controller portion controls so that the identifier information memorized in said work memory and the information indicative of the reproducing position obtained from said decoder portion are stored into said non-volatile memory on basis of the interruption instruction outputted from said interruption instruction means at the desired time duration or period. Further, there is provided a reproducing apparatus of an information recording medium, as defined in the above, wherein said work memory memorizes the identifier information which is identified in said drive controller portion, the video/audio data extracted from said drive controller portion, the information indicative of reproducing position, and information relating to a conversion method; and said controller portion controls so that the identifier information, the information indicative of the reproducing position, and the information relating to the conversion method, which are memorized in said work memory, are read out to be stored into said non-volatile memory on basis of the interruption instruction outputted from said interruption instruction means at the desired time duration or period. Furthermore, there is provide a reproducing apparatus of an information recording medium, as defined in the above, wherein said work memory memorizes the identifier information which is identified in said drive controller portion, the video/audio data extracted from said drive controller portion, the information indicative of reproducing position, and information relating to an output method for outputting from said video/audio portion; and said controller portion controls so that the identifier information, the information indicative of the reproducing position, and the information relating to the output method, which are memorized in said work memory, are read out to be stored into said non-volatile memory on basis of the interruption instruction outputted from said interruption instruction means at the desired time duration or period.

In this instance, it is preferable in the reproducing apparatus of an information recording medium, as defined in the above, wherein said non-volatile memory is so constructed that the information are memorized into plural different areas sequentially, and are over-written sequentially thereon when they are written into all of said plural areas. Further, it is preferable in the reproducing apparatus of an information recording medium, as defined in the above, further comprising set-up means for setting up information relating to output method for outputting from said video/audio output portion and for memorizing it into said work memory.

According to the present invention, for achieving the fourth object mentioned above, there is provided a reproducing/recording apparatus of an information recording medium, comprising:

a drive for writing information onto the information recording medium, and for reading out information recorded onto the information recording medium;

a drive controller portion for controlling said drive so as to write the information, and so as to extract video/audio from the recorded information recorded onto the information recording medium by reproducing thereof;

a work memory for memorizing information indicative of a writing-in position onto the information recording medium, and for memorizing the video/audio data being extracted in said drive controller portion;

an interruption instruction means for outputting an interruption instruction at a desired time period or frequency;

a controller portion for controlling the information indicative of the writing position which is memorized in said work memory so as to be read-cut and to be written into the information recording medium by said drive through said drive controller portion upon basis of the interruption instruction outputted at the desired time period or frequency from said interruption instruction means;

video/audio output portion for outputting video/audio; and a decoder portion for reading out the video/audio data stored in said work memory and for converting the read-out video/audio data into desired video/audio data to be outputted to said video/audio output portion.

In the instance, it is preferable a reproducing/recording apparatus of an information recording medium, as defined in the above, further comprising:

data input means for inputting data, wherein, said work memory memorizes the data inputted from said input means and the information indicative of writing position onto said information recording medium, and further memorizes the video/audio data extracted from said drive controller portion.

Further, it is also preferable a reproducing/recording apparatus of an information recording medium, as defined in the above, further comprising:

selecting means for selecting whether to start the writing from a position for continuous writing or not, wherein, said controller portion controls said drive controller portion to write the data from the position for continuous writing on basis of the information indicative of the writing position which is written onto said information recording medium when the writing from the position for continuous writing is selected through said selecting means.

And, also, it is preferable a reproducing/recording apparatus of an information recording medium, as defined in the above, further comprising:

a non-volatile memory, and wherein, said controller portion controls so that the information indicative of the writing position memorized in said work memory so as to be stored into said non-volatile memory on basis of the interruption instruction outputted from said interruption instruction means at the desired time duration or period.

Further, according to the present invention, for achieving the fifth object mentioned above, there is provided a reproducing/recording apparatus of an information recording medium, comprising:

a drive for writing information onto the optical information recording medium, and for reading out information recorded onto the information recording medium;

a drive controller portion for controlling said drive so as to write the information, and so as to extract video/audio from the recorded information recorded onto the information recording medium by reproducing thereof;

a data input portion for inputting data;

a work memory for memorizing the data inputted from said data input portion and information indicative of a position of a last portion of a writing area of said data onto the information recording medium, and for memorizing the video/audio data being extracted in said drive controller portion;

a controller portion for controlling the data memorized in said work memory to be read out and to be written into said information recording medium through said drive controller portion, and for controlling the information indicative of the last portion of said writing area to be read-out and to be written into said information recording medium by said drive through said drive controller portion;

video/audio output portion for outputting video/audio; and a decoder portion for reading out the video/audio data stored in said work memory and for converting the read-out video/audio data into desired video/audio data to be outputted to said video/audio output portion.

In this instance, it is preferable the decoder portion in the above reproducing/recording apparatus of an information recording medium is constructed so that the compression process such as MPEG and so on is treated to the data inputted through said data input portion.

Furthermore, according to the present invention, there is provided a reproducing method of video/audio signal recorded on an information recording medium with a reproducing apparatus, comprising:

reading out information from the information recording medium which is mounted on said reproducing apparatus;

detecting information indicative of a present position of the read-out from the information recording medium;

memorizing the information indicative of the present position of the reading-out; and re-starting the reading-cut of the information recorded onto the information recording medium by using said memorized information indicative of the present position of the reading-out, after interruption of electric power to said reproducing apparatus.

Also, according to the present invention, there is provided a reproducing method of video/audio signal as defined in the above, wherein the information indicative of the present position of the reading-out is memorized into a memory which is provided in said reproducing apparatus.

Furthermore, according to the present invention, there is provided a reproducing method of video/audio signal as defined in the above, wherein the information indicative of the present position of the reading-out is memorized at a predetermined time period.

According to the reproducing apparatus of an information recording medium for accomplishing the first object of the present invention, it is possible to obtain the reproduction of the medium directly from when electric power including electric power supply is turned ON next, even if the electric power supply is abruptly turned OFF or stopped due to bad electric power supply condition, and further if a power button is turned OFF with forgetting an operation of a last memory instruction key.

According to the reproducing apparatus of an information recording medium for accomplishing the second object of the present invention, it is possible to obtain the reproduction of the medium from the position for continuous reproduction, titles or chapters thereof, or from the beginning of the disc, upon the selection of user, when electric power including electric power supply is turned ON next again, even if the electric power supply is abruptly turned OFF or stopped due to bad electric power supply condition, and further if a power button is turned OFF with forgetting an operation of a last memory instruction key.

According to the reproducing apparatus of an information recording medium for accomplishing the second object of the present invention, it is also possible to obtain continuous reproduction of the video/audio output with maintaining the previous condition as before, when electric power including electric power supply is turned ON next, even if the electric power supply is abruptly turned OFF or stopped due to bad electric power supply condition, and further if a power button is turned OFF with forgetting an operation of a last memory instruction key.

According to the reproducing apparatus of an information recording medium for accomplishing the fourth object of the present invention, it is possible to continuously write the inputted data directly from when electric power including electric power supply is turned ON next, even if the electric power supply is abruptly turned OFF or stopped due to bad electric power supply condition.

According to the reproducing apparatus of an information recording medium for accomplishing the fifth object of the present invention, it is possible to write the inputted data continuously when electric power including electric power supply is turned ON next, with maintaining the previous condition even if the electric power supply is abruptly turned OFF or stopped due to bad electric power supply condition.

BRIEF DESCRIPTION OF DRAWING(S)

FIG. 1 shows an outline of the entire structure of an embodiment of a reproducing apparatus of information recording media, in particular, an optical information recording medium, according to the present invention;

FIG. 2 shows contents of a memory map which is constructed with an EEPROM as a last memory shown in FIG. 1;

FIG. 9 shows a memory map of the above-mentioned reproduced information, when being constructed by dividing the memory map shown in FIG. 2 into two for a reproduced information and a set-up information;

FIG. 10 shows a memory map of the above-mentioned set-up information, when being constructed by dividing the memory map shown in FIG. 2 into two for the reproduced information and the set-up information from;

FIG. 11 is a flow chart for showing the operation of a controller portion when power source is ON;

FIG. 12 shows a storage image of the data which is recorded into the last memory when executing the flow chart shown in FIG. 11;

FIG. 13 shows the operation of the controller portion after insertion of the disc therein, and, FIG. 14 shows a storage image of the data which is recorded into the last memory when executing the flow chart shown in FIG. 13.

DETAILED DESCRIPTION OF PREFERRED EMBODIMENTS

Figure 3:
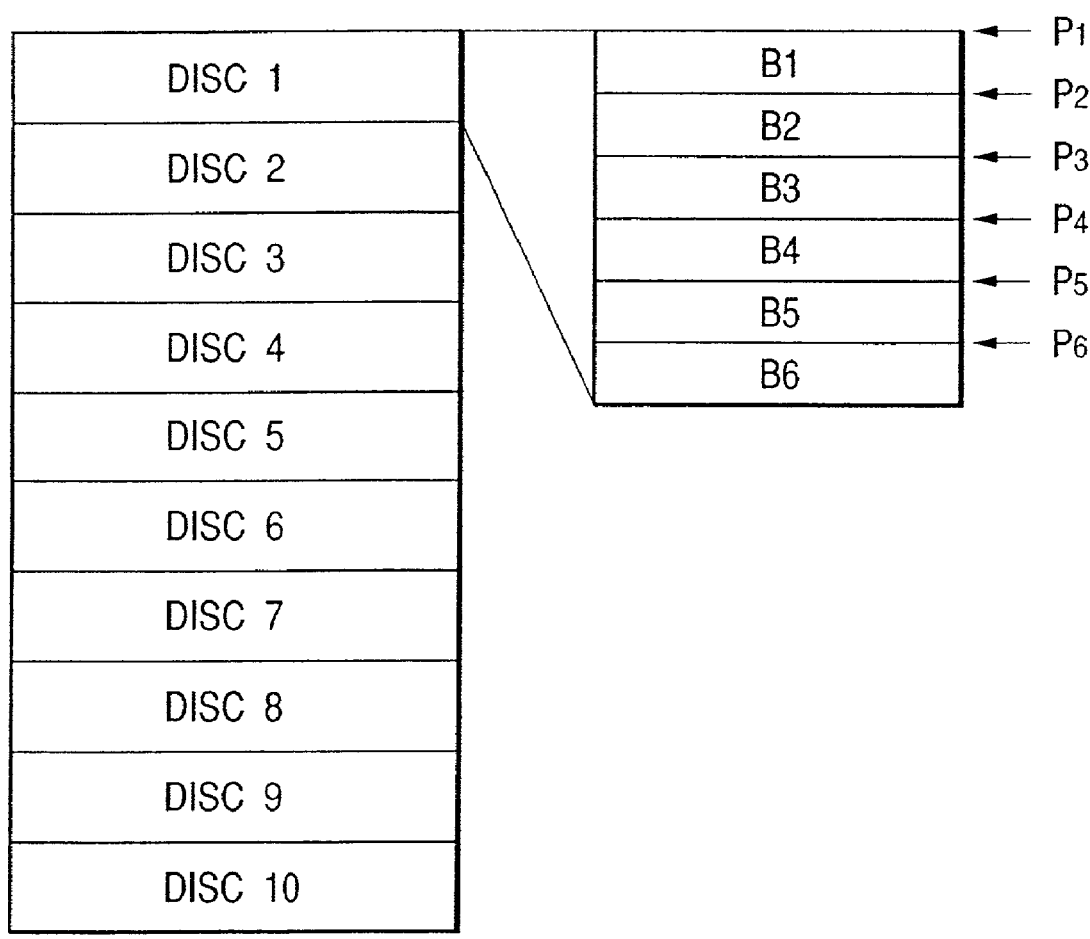
FIG. 3 shows memory areas within the last memory shown in FIG. 1.

Hereinafter, embodiments of a disc reproducing apparatus (i.e., a reproducing apparatus of the Digital Video Disc) according to the present invention will be fully explained by referring to the attached drawings.

Referring to FIG. 1 showing an outline of the entire structure of an embodiment of a reproducing apparatus of information recording media, in particular, an optical information recording medium, according to the present invention, a drive 1$a$ extracts or picks up digital data from a medium 1$aa$, such as a DVD, CD (so-called compact disc: an optical disc medium for recording an audio data in digital), and/or VCD (Video Disc: an optical disc medium for recording a video data in digital), etc. A reading means 1$ab$ reads out the information recorded in the medium 1$aa$. A driver means 1$ac$ drives the above medium 1$aa$ ratably and/or drives the reading means 1$ab$ to move. A drive controller portion 2$a$, which is constructed with a microcomputer and so on, controls the reproduction by the drive 1$a$ upon an instruction from a controller portion 6 through a bus 10 so as to read out the digital data relating the video/audio in the medium to be memorized into a work memory 3 through the bus 10, thereby having a function of identifying or discriminating the disc information, such as a kind or sort of the discs and an identifier (ID) of the disc, from the data of the information recorded in the medium.

The work memory 3 stores therein: the video/audio data which is read out and/or extracted from the optical disc by the drive controller portion 2$a$; the disc information obtained from the drive controller portion 2$a$; information indicative of video reproduction information and a video reproducing position obtained from a decoder portion 8; and the set-up information obtained from the controller portion 6 which is selectively inputted by a user or operator of the apparatus. This work memory 3 may be constructed with such as DRAM, etc., and is provided for collecting and summarizing the reproduced information to be stored into a last memory 9.

Further, the disc information obtained from the drive controller portion 2$a$ includes: (2) kind or sort of the medium, (3) identifier (DISC ID) of the disc, etc. Also, the video reproduction information obtained from the decoder portion 8 includes: (4) video information; (7) title number; (8) chapter number, etc. Further, the information indicative of the video reproducing position which is obtained from the decoder portion 8 includes: (9) information indicative of reproduction interruption position. And, the set-up information by the user's selection and input operations includes: (5) caption or subtitle; (6) audio, Karaoke; (10) a kind or sort of TV, OSD (On Screen Display); (11) APS (Audio Put System); (12) volume of each audio channel; (13) automatic reproduction; (14) OSD (On Screen Display) menu language; (15) disc menu language; (16) DRC (Dynamic Range Control); (17) screen saver, background color; (18) parental level; (19) optical digital output; (20) brightness of display; and (22) parental identification number (ID), etc.

The timer 4 functions as an interruption instructing means for giving an interruption instruction to the controller portion 6 at a random or arbitrary time period, such as every 1 min., for example here. This timer 4 may be constructed with an oscillator and a counter for counting a pulse signal generated and outputted from the above oscillator at a constant time period.

The controller portion 6, which is constructed with the micro-computer, etc., for controlling the optical disc reproducing apparatus as a whole, receives a selection operation signal 11 from a input portion 5 by operation of the user, and instructs the drive controller portion 2a, the decoder portion 8 and a video/audio output portion 7 so as to reproduce from the medium. Further, the input portion 6 controls in such a manner that the disc information obtained through the drive controller portion 2a, the video reproduction information obtained through the decoder portion 8, further the selection operation information obtained from the controller portion 6, and the set-up information by the input operation by the user are stored into the work memory 3. Furthermore, the controller portion 6 samples and/or extracts a physical position (i.e., video reproducing position) on the disc with respect to the display which is actually displayed under the control of the decoder portion 8, at the periodical interruption instruction timing of the timer 4 (every 1 min., for an example). And, the extracted information indicative of the video reproducing position is so controlled as to be stored into the last memory 9 corresponding to the information stored in the above work memory 3. Moreover, when an power switch is turned OFF, the controller portion 6 controls so that the information (i.e., LAST position information) indicative of the position of a last portion on recording/reproducing area at which is lastly recorded/reproduced as far as the electric power is supplied thereto, is read out from the work memory 3 to be stored into the last memory 9 corresponding to other information.

A video/audio output portion 7, which is constructed with a speaker(s) and/or a monitor (that may be constructed, for example, with a display, a liquid crystal display, etc.), converts the video digital signal decoded by, such as extension process within the decoder portion 8, etc., into an analogue signal (i.e., A/D conversion), and also converts the decoded audio digital signal into an analogue signal (i.e., A/D conversion), thereby outputting them as images and sounds thereof. If the speaker(s) and the monitor is constructed as a separate body from the optical disc reproducing apparatus, it is needless to say that the video/audio output portion 7 is constructed with output terminals for outputting the audio signal and/or video signal to the speaker(s) and/or the monitor, respectively.

The decoder portion 8 receives the instruction from the controller portion 6 to decode or decompress the digital data, such as those of the video/audio memorized in the work memory 3, which are compressed by means of such as MPEG-2 (Moving Picture Coding Expert Group 2: high efficiency coding technology for application to the current broadcasting and/or HDTV (High Definition TV) and to AV (Audio and/or Video) apparatuses, for internationally standardized multi-media data) so as to be extended or decompressed, thereby outputting the compressed video/audio digital data being decoded or expended to the video/audio output portion 7.

Further, the decoder portion 8 controls an information relating to bit stream (i.e., bit stream information) which is presently outputted and displayed on the video/audio output portion 7 as an internal condition or state thereof, therefore, that information is supplied from the decoder portion 8 to the work memory 3 to be memorized therein. Accordingly, by reading out or sampling that information from the work memory 3 at the interruption instruction timing (for example, every 1 min.) of the timer 4, it is possible to store that information into the last memory 9 as the information indicative of the video reproducing position. Namely, since the decoder portion 8 carries out the PTS (Presentation Time Stamp) management, the information of the physical position on the disc with respect to the display actually displayed on the reproduction process is supplied from the decoder portion 8 to the work memory 3 to be memorized therein. Therefore, the physical position, which is extracted by sampling thereof at the timing of the interruption instruction (for example, every 1 min.) of the timer 4, is stored into the last memory 9 as the information indicative of the video reproducing position. Moreover, the decoder portion 8 outputs the physical position information on the disc with regard to the display being actually displayed, and the information (i.e., the LAST position information) indicative of the last portion of the each recording/reproducing area, so as to be memorized into the work memory 3.

The controller portion 6 extracts the information indicative of the video reproducing position which is managed or controlled by the decoder portion 8, corresponding to the disc information, the video reproduction information, the set-up information which are read out at the timing (for example, every 1 min.) of the interruption instruction of the timer 4, by sampling at the timing (for example, every 1 min.) of the interruption instruction of the timer 4, thereby writing it into the last memory 9. The last memory 9, into which the disc information, the video reproduction information, the set-up information, and also the information indicative of the video reproducing position are written, may be constructed with, such as EEPROM (Electrically Erasable and Programmable Read Only Memory) having a limit in writing times thereof or with a non-volatile memory, such as a flash memory. In the case of the current EEPROM, the possible writing time is said to be 100,000. Also, into the last memory 9 is stored the information indicative of the position of the last portion of the recording/reproducing area where the recording/reproducing is actually done when the electric power switch is turned OFF (i.e., the information of indicative the LAST position), together with the disc information, the video reproduction information, and the set-up information.

Then, the drive controller portion 2a, the work memory 3, the controller portion 6, the video/audio output portion 7, the decoder portion 8, the timer 4 and the last memory are connected to one another through a bus 10.

As is explained in the above, during when the drive 1a is used (on reproduction), the information indicative of the video reproducing position, which is managed by the decoder portion 8, is extracted by sampling it at the timing (for example, every 1 min.) of the interruption instruction of the timer 4 on the basis of the control from the controller portion 6, and this extracted information indicative of the video reproducing position is stored into the last memory corresponding to the disc information, the video reproduction information and the set-up information which are read out from the work memory 3. The information indicative of the video reproducing position, which is managed by the decoder portion 8, is provided to the work memory 3 to be memorized therein, therefore, it is possible to be extracted from the work memory 3 by sampling it at the timing (for example, every 1 min.) of the interruption instruction of the timer 4, corresponding to the disc information, the video reproduction information and the set-up information. Further, the information indicative of the video reproducing position, which is managed by the decoder portion 8, is also possible to be extracted directly from the decoder portion 8 by sampling it at the timing (for example, every 1 min.) of the interruption instruction of the timer 4, corresponding to the disc information, the video reproduction information and the set-up information.

Accordingly, since the disc information, the video reproduction information, and the set-up information, as well as the information indicative of the video reproducing position, are always sampled and stored into the last memory 9 during the reproduction, at a desired time period or frequency, therefore, those information, i.e., the disc information, the video reproduction information, the set-up information, and the information indicative of the video reproducing position at the time just before it, are preserved when the power supply is abruptly broken down or is cut off under a bad condition of the electric power supply source of the apparatus. Therefore, when the power supply is turned ON again, it is possible to execute the reproduction continuously from that position, under the same output condition (output method) including the decoding method thereof.

However, since the decoder portion 8 executes the PTS (Presentation Time Stamp) control or management, the controller portion 6 controls so as to always obtain the physical position on the disc from the decoder portion with respect to the display actually indicated, during the production, to be memorized into the work memory 3. Then, by sampling and extracting the physical position on the disc which is memorized in the work memory 3 at the timing (for example, every 1 min.) of the interruption instruction of the timer 4, it can be stored into the last memory 9 as the information of the video reproducing position.

Next, the contents of a memory map in the case where the last memory 9 is constructed with the EEPROM will be explained by referring to FIG. 2.

Namely, in an address "000", there is stored (1) a "management number 0", i.e., the management number of the last memory of the controller portion 6, being an index (management number) as an information for each one piece of the disc.

In an address "001", there is stored (2) "kind of medium", i.e., "0" for the DVD disc, "1" for the VCD disc, and "2" for the CD.

In addresses "002" through "005", there is memorized the inherent information, i.e., "DISC ID".

In an address "006", there is stored (4) "video information", i.e., a: an aspect (X0: pan scan & letter box, X2: pan scan, X2: PAL (Phase Alternation by Line color television), b: image method (0X: AUTO, 1X:NTSC (National Television System Committee), 2X:PAL).

Where, "X" indicates that it can be any number. Explaining "X0: pan scan & letter box" as an example, "X0" means two-bit information of "X" and "0", and it is memorized as the "pan scan & letter box" by the lower one bit of the "X0". In the explanation given hereinafter, the meaning of it is same to that.

In an address "007", there is stored (5) "caption (or subtitle)", i.e., "00": caption OFF, 1–32: caption ON.

In an address "008", there is stored (6) "audio, Karaoke", i.e., a: audio (X0–X7), b: Karaoke (0X: normal, 1X: vocal OFF, 2X: vocal 1, and 3X: vocal 2.

In an address "009", there is stored (7) "title No.", i.e., position 0–99 where the reproduction is interrupted.

In an address "00A", there is stored (8) "chapter No.", i.e., position 0–99 where the reproduction is interrupted.

In addresses "00B"–"00E", there is stored (9) "reproduction interruption position", i.e., the position just before when the power supply is abruptly interrupted or cut off (i.e., the video reproducing position), or the position of the last portion (the LAST position) of interrupting the reproduction designated by the user (for example, it can be indicated by time, including hour, minute and second or the address on the disc).

In an address "00F", there is stored (10) "kind of TV, OSD (On Screen Display) position", i.e., X0: 4:3, X1: 16:9, X: above OSD, 1X: below OSD, and 2X: FF.

In an address "010", there is stored (11) "audio output position (Audio Put System)", i.e., XXXXXXX1: having surround speakers, XXXXXXX0: no surround speakers, XXXXXX1X: having center speaker, XXXXXX0X: no center speaker, XXXXX1XX: having sub-woofer, and XXXXX0XX: no sub-woofer.

In addresses "011"–"016", there is stored (12) "FL (Front Left Channel), FR (Front Right Channel), SL (Sub Left Channel), SR (Sub Right Channel), center, sub-woofer sound volume", i.e., output levels (display value) of DAC.

In an addresses "017", there is stored (13) "automatic reproduction", i.e., 0: no automatic reproduction when plugging socket (power OFF), 1: automatic reproduction when plugging socket.

In an addresses "018", there is stored (14) "OSD menu language", i.e., combination of OSD display and language of display.

In an addresses "019", there is stored (15) "disc menu language".

In an addresses "01A", there is stored (16) "DRC (Dynamic Range Control)", i.e., 0: ON, and 1: OFF.

In an addresses "01B", there is stored (17) "screen saver, background color", i.e., X0: screen saver OFF, X1: screen saver ON, and 0X–FX: background colors.

In an addresses "01C", there is stored (18) "parental level", i.e., 1–8.

In an addresses "01D", there is stored (19) "optical digital output", i.e., 0: no, 1: AC3/LPCM, and 2: LPCM.

In an addresses "01E", there is stored (20) "brightness of display", i.e., 00: normal, 01: dim. 1, 2: dim. 2, and 03: OFF.

In an addresses "01F", there is stored (21) "CHECK SUM", i.e., addition result for each bite of the above (1)–(19).

In addresses "7EE" and "7EF", there is stored (22) "parental identification No.", i.e., four digit number(BCD).

With the optical disc reproducing apparatus, it is possible to obtain the disc information relating to the (2) "kind of medium", and the (3) identifier ("DISC ID") by reading out the recorded data on the medium 1*aa* which is set into the drive 1*a* with the reading means lab and further by extracting it with the drive controller portion 2*a*. Accordingly, when the medium 1*aa* is set into the drive 1*a* to be reproduced, first the disc information is extracted from the drive controller portion 2*a* and memorized into the work memory 3. In this way, as with the disc information, it is first extracted from the drive controller portion 2*a* and memorized into the work memory 3, therefore, it is possible to be obtained by reading out at the timing (for example, ever 1 min.) of the interruption instruction of the timer 4 upon the basis of the instruction from the controller portion 6.

Further, as with the above-mentioned (4) "video information", (7) "title No.", and (8) "chapter No." which are stored in the last memory 9, they are obtained through the decoder 8 and are stored into the work memory 3, therefore, they are able to be obtained by reading out at the timing (for example, ever 1 min.) of the interruption instruction of the timer 4 upon the basis of the instruction from the controller portion 6. Namely, the (4) "video information", i.e., a: aspect ratio and b: image method, when the user set up it by using the user operation input portion 5, is stored into the work memory 3, at the same time it is set up in the decoder portion 8. The (7) "title No." and the (8) "chapter No." are stored into the last-memory by reading out the internal condition or state of the decoder 8, for dealing with both of the cases where the user does not set up particularly with the automatic reproduction, and where the operator set up them. In this manner, the video reproduction information relating to the (4) "video information", the (7) "title No.", and the (8) "chapter No." are the information relating to the decoding method for decoding the data to be extended in the decoder portion 8.

As with the set-up information as the output condition (the output method) for the output from the video/audio output portion 7, including the (5) "caption", the (6) "audio, Karaoke", the (10) "kind of TV, OSD (On Screen Display)", the (11) "Audio Put System", the (12) sound volume of each voice channel, the (13) "automatic reproduction", the (14) "OSD menu language", the (15) "disc menu language", the (16) "DRC", the (17) "screen saver, background color", the (18) "parental level", the (19) "optical digital output", the (20) "brightness of display", and the (22) "parental identification No.", etc., since they are set up with the inputting from the user operation input portion 5 and are stored in the work memory 3, they can be obtained by reading out them at the timing (for example, ever 1 min.) of the interruption instruction of the timer 4 on the basis of the instruction from the controller portion 6.

Further, as with the set-up information relating to the video/audio output portion which are stored in the last memory 9, including the (1) "management No. 0", the (5) "caption", the (6) "audio, Karaoke", the (10) "kind of TV, OSD (On Screen Display)", the (11) "Audio Put System", the (12) sound volume of each voice channel, the (13) "automatic reproduction", the (14) "OSD menu language", the (15) "disc menu language", the (16) "DRC (Dynamic Range Control)", the (17) "screen saver, background color", the (18) "parental level", the (19) "optical digital output", the (20) "brightness of display", and the (22) "parental identification No.", etc., are the information forming a pair together with the above-mentioned disc information and the video reproducing information, therefore they can be obtained with the controller portion 6 by selection and operation by the user through the user operation input portion 5. Of course, those information are also stored into the work memory 3.

Further, the (9) "information indicative of reproduction interruption position" is obtained under different condition, between when the power supply is abruptly turned OFF or is cut off under the bad condition of the electric power supply source, and when the power button is normally turned OFF. In the case where the power supply is abruptly turned OFF or is cut off under the bad condition of the electric power supply source, it comes to be the information indicative of the position where the sampling is made just before at the timing (for example, ever 1 min.) of the interruption instruction of the timer 4 (the information indicative of the video reproducing position). Actually, as will be explained later, it is stored into a plurality of different areas in the last memory every time when it is sampled, and it is written over it (i.e., over-write) if completing one cycle, therefore, when the power supply is abruptly turned OFF or is cut off, the information indicative of the plural positions of the samplings before it (the information indicative of the video reproducing positions) has been stored. Alternatively, when the power button is normally turned OFF, it comes to be the information indicative of the last portion of the recording/reproducing area (the information indicative of LAST position) where the recording/reproducing was made.

Next, an explanation will be given on a way of memorizing into the last memory 9. Namely, the reproduced information of the optical disc (medium), such as the disc information of 32-bite, the video reproduction information, the set-up information, and also the reproduction interruption position information, are recorded one by one into the memory areas from P1 to P5 for example, as is shown in FIG. 3, and if it reaches up to the last area P5, it is over-written to be memorized from the area P1 again. When the disc set into the drive 1a is reproduced, then the reproduced information (32-bite) are recorded, i.e., a first reproduced information (32-bite) is recorded into the area P1 after passing for example 1 min. being the sampling time, a second one into P2 1 min. thereafter, a third one into P3 further 1 min. thereafter, and a fourth one into P4 furthermore 1 min. thereafter. And, if the recording of the reproduced information is made into P5, then the next reproduced information is over-written to be recorded into the P1 again.

Accordingly, as shown in FIG. 3, with the above-mentioned memory map (EEPROM of 2K), it is possible to record the information for at the most ten (10) pieces of the discs, with the rotation of about six (6) turns for each disc thereof. B1–B6 indicate the areas where the reproduced information being sampled is memorized sequentially, in the each disc which is set into the drive 1a. Disc1-Disc10 indicate the areas in which the information is recorded for the ten (10) pieces of the discs which are set into the drive 1a.

Then, assuming that the optical disc reproducing apparatus is used for four (4) hours per a day, if the controller portion 6 writes into the last memory, i.e., the EEPROM, the information, including the disc information, the video reproduction information, the set-up information, and also the information indicative of the video reproducing position as the information indicative of the reproduction interruption position, at one time per 1 min., they are written into 240 times per a day. However, as was mentioned in the above, the number of times of when they are written into the same position comes to be only 40 times per a day, by making the rotation of 6 times. Therefore, until when the number of times of writing-in into the EEPROM comes up or reaches to 100,000 time, the maximum permissible time for EEPROM, it is possible to continued to write into it for six (6) years and two (2) months. Accordingly, it is possible to write the information, including the disc information, the video reproduction information, the set-up information, and also the information indicative of the video reproducing position as the information indicative of the reproduction interruption position, at every 1 min., into the last memory 9, i.e., EEPROM.

As was explained in the above, the present invention lies in that the information of the disc on reproduction, including the disc information, the video reproduction information, the set-up information, and also the information indicative of the video reproducing position as the information indicative of the reproduction interruption position, which are memorized in the work memory 3, are stored into the last memory 9 which is constructed with a non-volatile memory, such as EEPROM or flash memory, at the timing (for example, ever 1 min.) of the interruption instruction of the timer 4, on the basis of the control from the controller portion 6. Accordingly, with the optical disc reproducing apparatus according to the present invention, even if the power supply is abruptly turned OFF due to the bad condition of the electric power supply source, or if power supply is turned OFF due to the interruption of the power supply, or if the power switch (power button) is turned OFF, the disc information, the video reproduction information relating to the decoding method, the set-up information for the video/audio output portion, and also the information indicative of the reproducing position as the reproduction interruption position information are stored and reserved in the last memory. Therefore, even if the power supply is turned OFF abruptly or unexpectedly, when the power switch (power button) is turned ON next, it can continue to reproduce them from that position.

Next, an explanation will be given on an initial mode upon a next turning-ON of the power supply, and a processing flow in the initial operation.

First, the initial mode upon the next or following turning-ON of the power supply will be explained.

(1) In a case where the optical disc is inserted or was already inserted into the drive 1, the information of which are reserved into the last memory 9, including the disc identifier (ID), the video reproducing information, the set-up information for the video/audio output portion, the information indicative of the video reproduction position as the reproduction interruption position, and the information indicative of the LAST position as well, therefore, the user can select the reproduction from the position at which the reproduction was stopped previously or the power switch is turned OFF or the power supply is interrupted abruptly, or the reproduction from the beginning of the disc.

(2) For a new disc, it is in a default mode to reproduce it from the beginning thereof. Namely, in the case of the new disc, the controller portion 6 sets up the default values, which are inputted by using of the user operation input portion 5 or the like, for the video/audio output portion 7.

Next, the processing flow of the initial operation will be explained by referring to FIG. 4.

Fist, in a step S41, when the optical disc is set (or inserted) into the drive 1, the drive controller portion 2 obtains the disc identifier (Disc ID) and so on from the drive 1 and memorized it/them into the work memory 3 through the bus 10.

Next, in a step S42, the controller portion 6 checks whether exists the disc identifier (Disc ID) being same to that memorized in the work memory 3 within the disc identifiers stored in the last memory 9 or not. When it is "Yes", the process turns back to the initial mode of (1) mentioned above, while it goes to the initial mode (default mode) of (2) mentioned above when it is "No".

Then, in a step S43, the controller portion 6 reads out the video reproduction information attached with the above disc identifier, i.e., the (4) "video information", the (7) "title No.", the (8) "chapter No.", as well as the information indicative of the reproduction interruption position, i.e., the information indicative of the video reproducing position at which the sampling is made and the information indicative of the LAST position, which are memorized in the last memory 9, so as to obtain and memorize them into the work memory 3.

Figure 5:
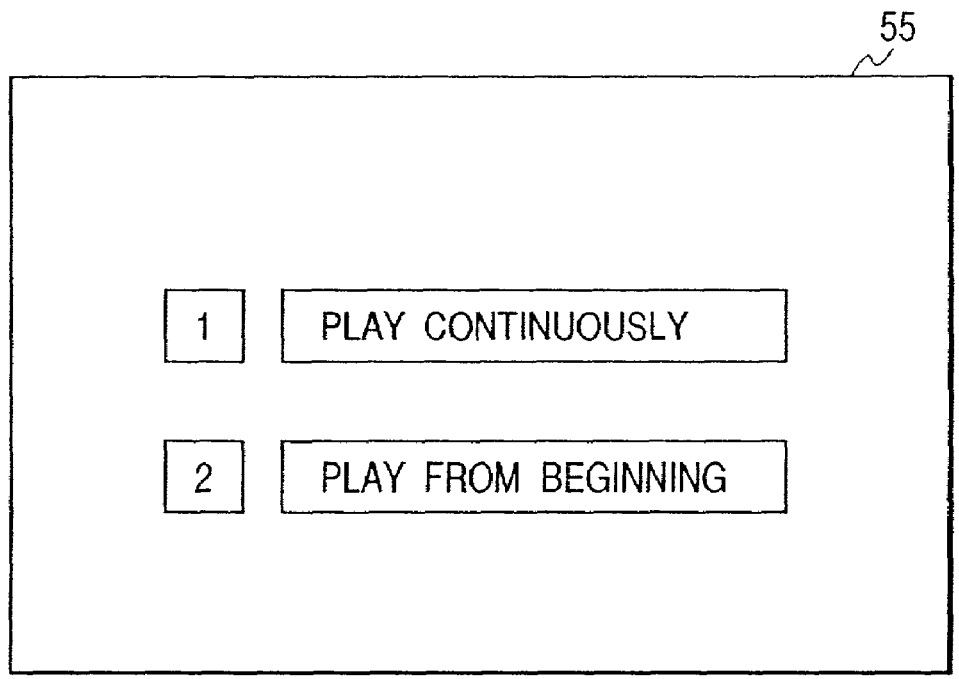
FIG. 5 shows a menu display for selecting between continuous play and play from beginning.

Next, in a step S44, the controller portion 6 reads out a program of the menu display 55 shown in FIG. 5, which is memorized in the last memory 9, and display it on the monitor (display means) of the video/audio output portion 7, so as to provide user's selection items.

Figure 6:
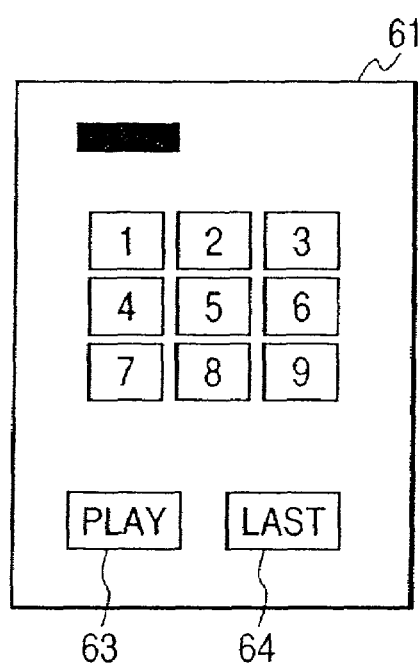
FIG. 6 shows a remote controller for selecting between continuous play and play from beginning.

Next, in a step S45, when the user selects either one of "1. Continuous play" or "2. Play from beginning" with the menu display presented on the monitor, then result of the selection his inputted into the controller portion 6. However, in the above step S45, the user also can select the either one of "1. Continuous play" or "2. Play from beginning", by inputting it into the controller portion 6 through a remote controller 61, as is shown in FIG. 6. A reference numeral 63 shows a "LAST" button, and it enables the continuous reproduction from the interruption position if it is pushed down. A reference numeral 64 shows a button of "Play", and it enables the reproduction from the beginning of the title. Further, it is also possible to reproduce the disc from the beginning of the chapter by designating it through a keyboard 62 or the like.

Next, the controller portion 6, if the user selects the "1. Continuous play" in the step S45, provides a driver controlling signal to the drive controller portion 2, on the basis of the information and so on, including the information indicative of the video reproducing position as the information indicative of the reproduction interruption position, which is read out from the last memory 9 depending upon the selection result and memorized in the work memory 3. Further, it sets up the areas addresses, for memorizing the compressed video/audio digital data into the work memory 3, which is read out from the optical disc with continuity from the interruption position thereof.

Following to the above, in a step S47, the controller portion 6 provides the decoding method to the decoder portion 8 on the basis of the video information of the video reproduction information, which is read out from the last memory corresponding to the above-mentioned selection result and is memorized in the work memory 3. The controller portion 6 also sets up the video outputting method to be outputted at the video/audio output portion 7 on the basis of the set-up information for the video/audio output portion. Following to the above, when completing the setup into the work memory and the setup of the video outputting method, the controller portion 6, in a step S48, reads out the compressed video/audio digital data continuously from the interruption position from the optical disc, by giving continuous reproduction instructions to the drive controller portion 2 and to the decoder portion 8, so as to memorize them into the work memory 3 being set up with the address areas thereof. Further, the controller portion 6 controls so that the decoder portion 8 decodes the compressed video/audio digital data which is read out from the work memory 3 in accordance with the above-mentioned decoding method, and an output of the preset output method (output condition) is provided from the video/audio output portion 7, so as to reproduce it continuously from the interruption position thereof.

However, in the step S42, the controller portion 6 checks whether exists the disc identifier (Disc ID) being same to that memorized in the work memory 3 within the disc identifiers stored in the last memory 9 or not, and if it is "No", turns back to the initial mode (default mode) of (2) mentioned above.

Further, if the user selects the "(2) Play from beginning" in the step S45, since video reproduction information is already obtained into the work memory 3 in the step S43, the controller portion 6, in a step S49, provides the drive controller portion 2 with the title or the chapter or the drive controlling signal from the beginning of the disc on the basis of the video reproduction information obtained. Further, the controller portion 6 set up the address areas for memorizing the title, the chapter or the compressed video/audio digital data from the beginning of the disc into the work memory 3. Following to this, in a step S50, the controller portion 6 provides the decoder portion 8 with the decoding method on the basis of the video information of the video reproduction information which is read out from the last memory corresponding to the above-mentioned selection result, and sets up the video outputting method with which the output is provided by the video/audio output portion 7, on the basis of the set-up information for the video/audio output portion as well. Following to the above, when completing the setup into the work memory and the set-up of the video outputting method, the controller portion 6, in a step S51, gives the instruction of reproduction of the title or the chapter or that from the beginning, to the drive controller portion 2 and to the decoder portion 8, so that the compressed video/audio digital data from the beginning is read out from the disc to be memorized into the areas of the set-up or preset addresses it of the work memory 3. Further, the controller portion 6 makes the decoder portion 8 to decode the compressed video/audio digital data read out from the work memory 3 with the above-mentioned decoding method, so as to output it from the video/audio output portion 7 with the set-up or preset output method (output condition), thereby reproducing the title or the chapter or the disc from the beginning thereof.

Accordingly, with the optical disc reproducing apparatus according to the present invention, even if the power supply is abruptly turned OFF due to the bad condition of the electric power supply source, or if power supply is turned OFF due to the interruption of the power supply, or if the power switch (power button) is turned OFF, since the information indicative of the reproducing video position under the reproducing condition just before, and the set-up information relating to the disc information, and the video reproduction information for the video/audio output portion, are stored and reserved in the last memory 9, the reproduction can be done depending upon the "(1) Continuous play" or the "(2) Play from beginning" designated with selection by the user, in the above-mentioned reproducing mode (1), by turning the power switch (power button) OFF.

Also with the discs which were already played, the video reproduction information and the set-up information are stored in the last memory 9 for at the most ten (10) pieces thereof, the controller portion 6 is able to provide the video reproduction information to the decoder portion 8, as well as to set up the set-up information into the video/audio output portion 7.

Or, when a new disc is inserted into the drive 1 and the power switch (power button) is turned ON, the reproduction is started from the beginning thereof under the default condition following the above-mentioned reproducing mode (2) (default).

Figure 7:
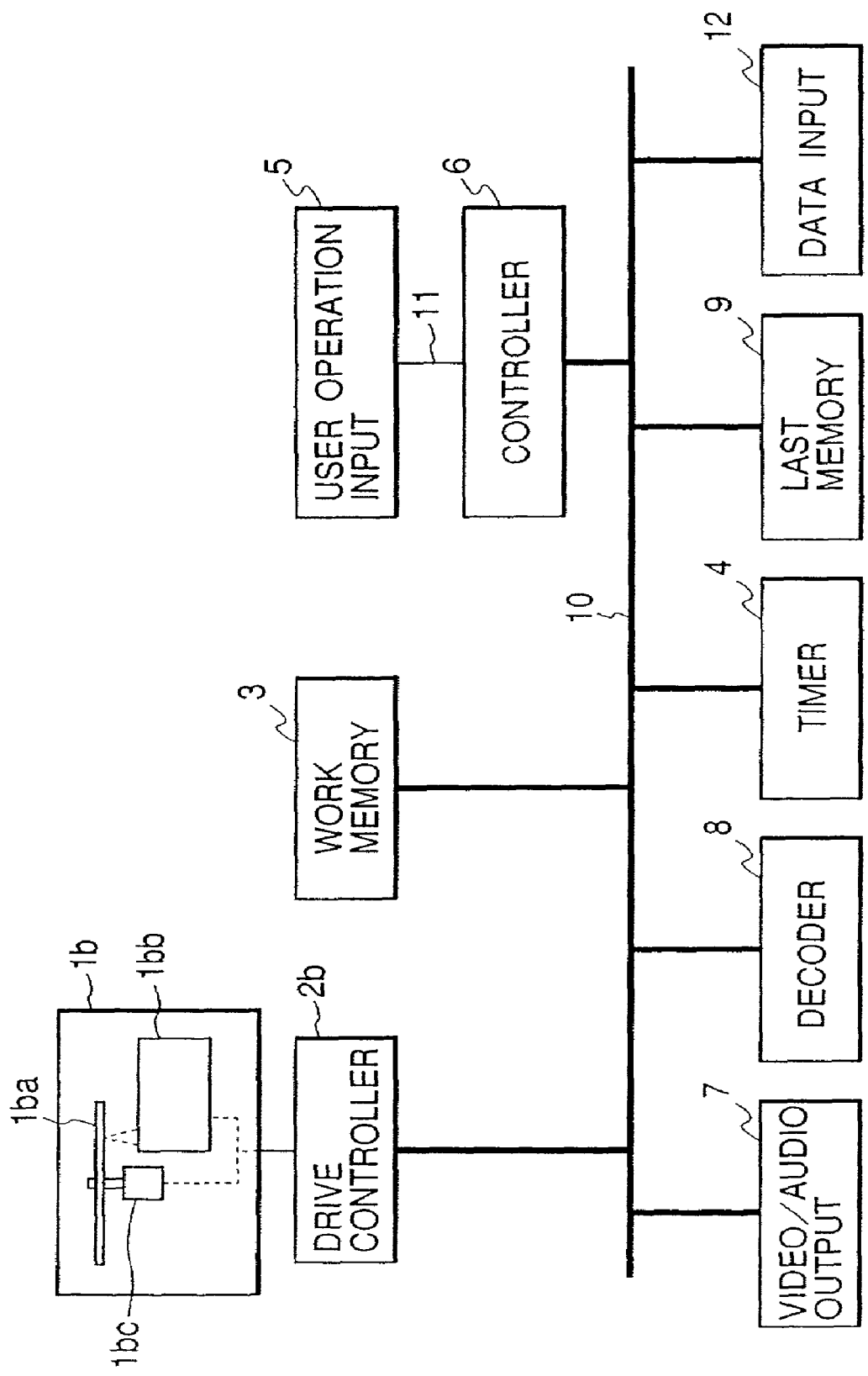
FIG. 7 shows an outline of the entire structure of an embodiment of a recording/reproducing apparatus of information recording media, in particular, an optical information recording medium, according to the present invention.

Next, an embodiment of an optical disc recording/reproducing apparatus (i.e., a recording/reproducing apparatus applying such a so-called DVD-RAM apparatus therein) will be explained by referring to attached drawings. FIG. 7 shows an outline of the entire structure of the optical disc recording/reproducing apparatus according to the present invention. A drive 1*b* extracts or picks up digital data from a medium 1*ba* of the optical information recording medium, such as a DVD-RAM, or writes or memorizes the digital data therein. A reading/writing means 1*bb* has a function of reading out the information recorded in the medium 1*ba* and also a function of writing the digital data into the medium 1*ba*. A driver means 1*bc* drives the above medium 1*ba* ratably and/or drives the reading/recording means 1*bb* to move or sift. A drive controller portion 2*b* is constructed with a micro-computer and so on. And, the drive controller portion 2*b* controls the reproduction/recording by the drive 1*b* upon an instruction from a controller portion 6 through a bus 10 so that digital data relating to the video/audio in the medium is read out to be memorized into the work memory 3 through the bus 10, or the digital data memorized in the work memory 3 is read out to be memorized into the medium through the bus 10. Also, the drive controller portion 2*b* has a function of identifying or discriminating the disc information, such as the kind the discs and the identifier (ID) of the disc, from the data in the information recorded in the medium.

The work memory 3 stores therein the video/audio data which is read out and/or extracted from the optical disc by the drive controller portion 2*b*, the disc information obtained from the drive controller portion 2*b*, an information indicative of the video reproduction information and the video reproducing position obtained from a decoder portion 8, and the set-up information obtained from the controller portion 6 which is selectively inputted by the user or operator of the apparatus. This work memory 3 also may be constructed with such as DRAM, etc., and is provided for collecting and summarizing the reproduced information to be stored into a last memory 9. Also, the work memory 3 has a function of memorizing the data for writing it/them into the medium 1*ba* set in the drive 1*b*.

The details of the disc information obtained from the drive controller portion 2*a*, the video reproduction information obtained form the decoder portion 8, the information indicative of the video reproducing position obtained from the decoder portion 8, the selection operation of the user obtained from the controller portion 6, and the set-up information by the input operation are as be mentioned in the above.

The timer 4 also functions as an interruption instructing means for giving an interruption instruction to the controller portion 6 at a random or arbitrary time period, such as every 1 min., for example here. This timer 4 may be constructed with an oscillator and a counter for counting a pulse signal generated and outputted from the above oscillator at a constant time period.

The controller portion 6 has also the functions same to those in the optical disc reproducing apparatus shown in FIG. 1, and further samples and/or extracts the physical position (i.e., video reproducing position/video writing position) on the disc which is controlled by the decoder portion 8, at the interruption instruction timing of the timer 4 (every 1 min., for an example), so as to control the writing or recording of the information indicative of the extracted video recording position (video writing position) into the medium 1*ba* by the reading/writing means 1*bb* through the drive controller portion 2*b*. Moreover, when an power switch is turned OFF, the controller portion 6 controls so that the position information (i.e., the LAST position information) of the last portion of recording area which is lastly recorded, as far as the electric power is supplied thereto, is read out from the work memory 3, so as to be written into the medium 1*ba* by means of the reading/writing means 1*bb* through the drive controller portion 2*b*.

A video/audio output portion 7 has also the same construction to that of the optical disc reproducing apparatus as was shown in FIG. 1.

A decoder portion 8 has also the same function to that in the optical disc reproducing apparatus shown in FIG. 1. Further, the decoder portion decodes the digital data of video/audio, etc., inputted from a data input portion 12 into the compressed digital data of video/audio and so on, according to the MPEG-2 for example, so as to store it into the work memory 3, and also performs the PTS management as well, therefore, it is so constructed that also the information can be outputted therefrom, which is indicative of addresses for writing it into the medium 1*ba* set in the drive 1*b* (i.e., the information of the video recording position).

The last memory 9 has also the same function to that in the optical disc reproducing apparatus as was shown in FIG. 1.

The data input portion 12 is constructed with a camera, an image scanner and so on for inputting the digital data of the video/audio and so on therein.

And, the drive controller portion 2*b*, the work memory 3, the controller portion 6, the video/audio output portion 7, the decoder potion 8, the last memory 9 and the data input portion 12 are also connected through the bus 10.

As is explained in the above, the data of the video/audio and so on inputted from the data input portion 12 is converted in the decoder portion 8, into the digital data to be written into the medium 1*ba*, and is also memorized into the work memory 3. Also, the information indicative of the recording position into the medium 1*ba* is extracted from the decoder 8, by sampling at the timing (for example, every 1 min.) of the interruption instruction of the timer 4, and the information indicative of the last position of the recording area at which the recording is made lastly (the information indicative of the LAST position) onto the medium 1*ba* are also stored into the work memory 3.

And, the controller portion 6 reads out the digital data of the video/audio and so on which is stored in the work memory 3, the recording position information sampled, and the information indicative of the position of the last portion (the information indicative of the LAST position), and then controls them to be sent to the drive controller portion 2*b* through the bus 10. Then, the drive controller portion 2*b* controls the drive 1*b* so that the received digital data of the video/audio and so on, the recording position (writing position) sampled, and the information indicative of the position of the last portion (the information inactive of the LAST position) are written into the medium 1*ba*.

Therefore, when the digital data is written into the medium 1*ba*, even if the power supply is abruptly interrupted due to the bad condition of the electric power supply source or is stopped, it is possible to write the digital data continuously from the position of the interruption when the power supply is turned ON again, since the recording position information sampled just before it is already written into the medium 1*ba*. However, in the case where the sampling is carried out every 1 min., for example, the digital data is over-written during the time period less or shorter than the 1 min., starting from the sampling was done and up to the time when the power supply was abruptly interrupted or stooped, for instance. Ordinarily, since the information indicative of the position of the last portion (the information indicative of the LAST position) was written into the medium 1*ba* when the power switch is turned OFF, the writing of the digital data is done judging from this information indicative of the position of the last portion (the information indicative of the LAST position) when writing the digital data thereafter.

Further, it is also possible to read out the information indicative of the sampled recording position (writing position) to be written into the medium 1*ba*, and the information indicative of the position of the last portion (the information indicative of the LAST position) to be stored into the last memory 9.

Also, when reproducing the information recorded onto the medium 1*ba*, it is possible to reproduce it in the similar manner of the optical disc reproducing apparatus as shown in FIG. 1, so as to be outputted from the video/audio output portion 7.

Next, an another embodiment of the optical disc reproducing apparatus, according to the present invention, will be explained by referring to the attached drawings. Here, an aspect, differing from the embodiment mentioned in the above, lies in that the last memory has different construction. However, since the present optical disc reproducing apparatus is same to the above-mentioned embodiment, in particular, in the construction, the operation and so on, the detailed explanation of those will be omitted for eliminating duplication thereof.

Figure 8:
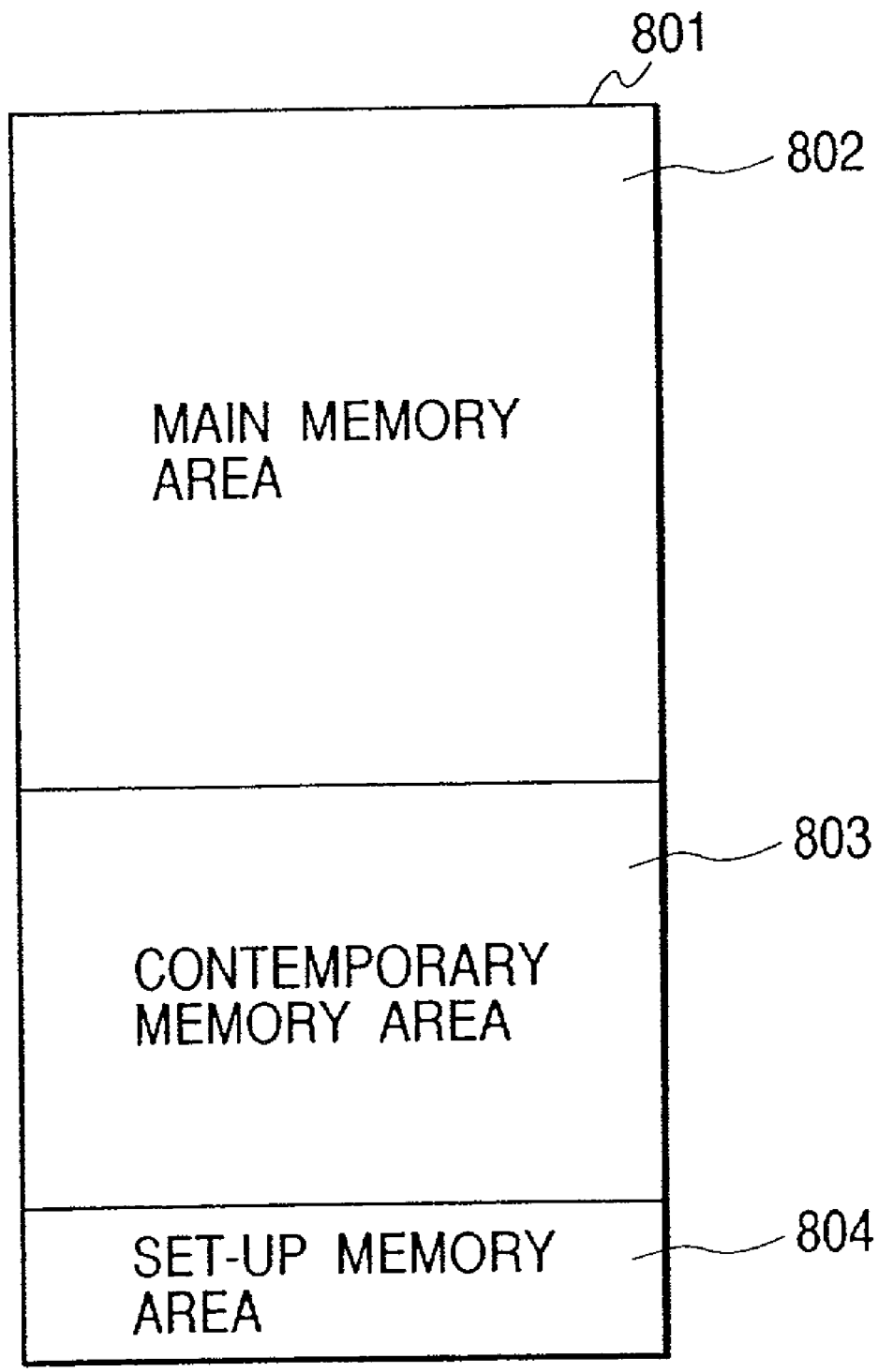
FIG. 8 shows a concept of the last memory which is divided into a contemporary memory area for memorizing reproduced information rotationally or cyclically during when a disc is inserted, and a main memory area for memorizing the reproduced information only when the disc is exchanged.

FIG. 8 shows an image of memory map in the above embodiment, wherein the last memory 9 is divided into a contemporary memory area or region for memorizing the reproduced information therein, rotationally or circularly during the disc is inserted, and a main memory area or region for memorizing the reproduced information therein when the disc is exchanged.

In FIG. 8, a reference numeral 801 indicates an image in use of the last memory 9. A reference 802 indicates the main memory area for memorizing the reproduced information in it, 803 the contemporary memory area for memorizing the reproduced information in it rotationally or circularly, and 804 a set-up memory area for memorizing the selection operation and the set-up information by the input operation by the user.

An explanation will be given on the above-mentioned reproduced information and the set-up information, hereinafter.

FIG. 9 shows the memory map for the above-mentioned reproduced information being constructed from the memory map shown in FIG. 2, by dividing it into two for the reproducing information and for the set-up information, separately.

In FIG. 9, a reference numeral 901 indicates the reproduced information, 902 addresses, 903 sizes of elements, and 904 contents of the reproduced information. A "disc ID" 905 is the identifier inherent for each disc, such as the Volume Descriptor and so on in the case of the VCD, as mentioned in ISO standard No. 9660 for example. The "management No. 0" 906 is an index when storing the reproduced information into the contemporary memory area 803, the "kind of medium" an identifier for various kinds of media, such as DVD, VCD, etc., the "last position" 908 the reproducing time when the interruption occurs, the "management No. 1" 909 an index when storing the reproduced information into the above-mentioned main memory area 802, the "aspect, NTSC/PAL" 910 the aspect ratio and the kind of video signals, the "caption" a caption identifier for English or Japanese, the "audio, Karaoke" 912 an identifier for the audio channel, the "title No." 913 the title number when reproducing the DVD, the "chapter No." 914 the chapter number when reproducing the DVD, the "title No. 2" 915 the title number having the caption, the "CRC" 916 data for CRC error correction of the information of the above-mentioned 905–915. Here, the "title No.1" 913, the "chapter No." 914 and the "title No. 2" 915 may be the track number of the disc or the read-out addresses thereof, for example, in the case of the VCD, CD-DA and other media. The above-mentioned reproduced information has about 32 bite in total.

FIG. 10 shows the memory map for the above-mentioned set-up information being constructed from the memory map shown in FIG. 2, by dividing it into two for the reproducing information and for the set-up information separately. The set-up information is inherent to the optical disc reproducing apparatus, and it is set up into the work memory 3 when it is turned ON with power source. The existence of the display for selection of continuous reproduction shown in FIG. 5 is also contained in the set-up information.

In FIG. 10, the set-up information 1001 indicates the contents of the position address 1002 within the last memory 9, the size of element 103, and the set-up information 1004. The set-up information 1001 is constructed with memory of about 32 bite and stored into the set-up memory area 804, including information, such as "kind of TV", "OSD position", "audio output position", "FL sound volume", "FR sound volume", "SL sound volume", "SR sound volume", "center sound volume", "sub-woofer sound volume", "automatic reproduction", "OSD menu language (English/Japanese, etc.)", "disc menu language (English/Japanese, etc.)", "DRC", "screen saver", "presence of background color", "parental level", "presence of optical output", "brightness of display", "still video format", "parental pass-word", and "parental identification number", etc.

Here, the set-up information must not be preset or set up depending on the kinds of the media.

Next, an explanation will be given on the method for storing the above-mentioned reproduced information (32 bite) into the contemporary memory area.

When the optical disc (medium) is set into/onto the drive, as is shown in FIG. 12, first of all, a first reproduced information from P1 is recorded after 1 min. therefrom, for example, as the sampling time thereof, then a second one from P2 after 1 min. therefrom, and a third one from P3 further after therefrom, thereby the reproduced information being recorded sequentially, and when the reproduced information from P11 is recorded, then the reproduced information is next over-written thereon from P1 again. In the mean time, the controller portion 6 records the "management No. 0" of the above reproduced information by incrementing it by one (+1) each. In that instance, the value of the "management No. 0" and the recording position thereof are recorded into the work memory 3. Here, if the "management No. 0"exceeds the maximum value FF Hex, it starts from "0" again when it is recorded.

Here, the controller portion 6 searches the "management No. 0"s in the contemporary memory area 803 when the electric power is turned ON so as to obtain the maximum value of the "management No. 0" to be memorized into the work memory 3, and the serial number following to it is given to it when it is memorized into the contemporary memory area 803 next.

Then, an explanation will be given on the storing method of the reproduced information into the main memory area 802, along with actual operations of the optical disc reproducing apparatus.

Figure 11:
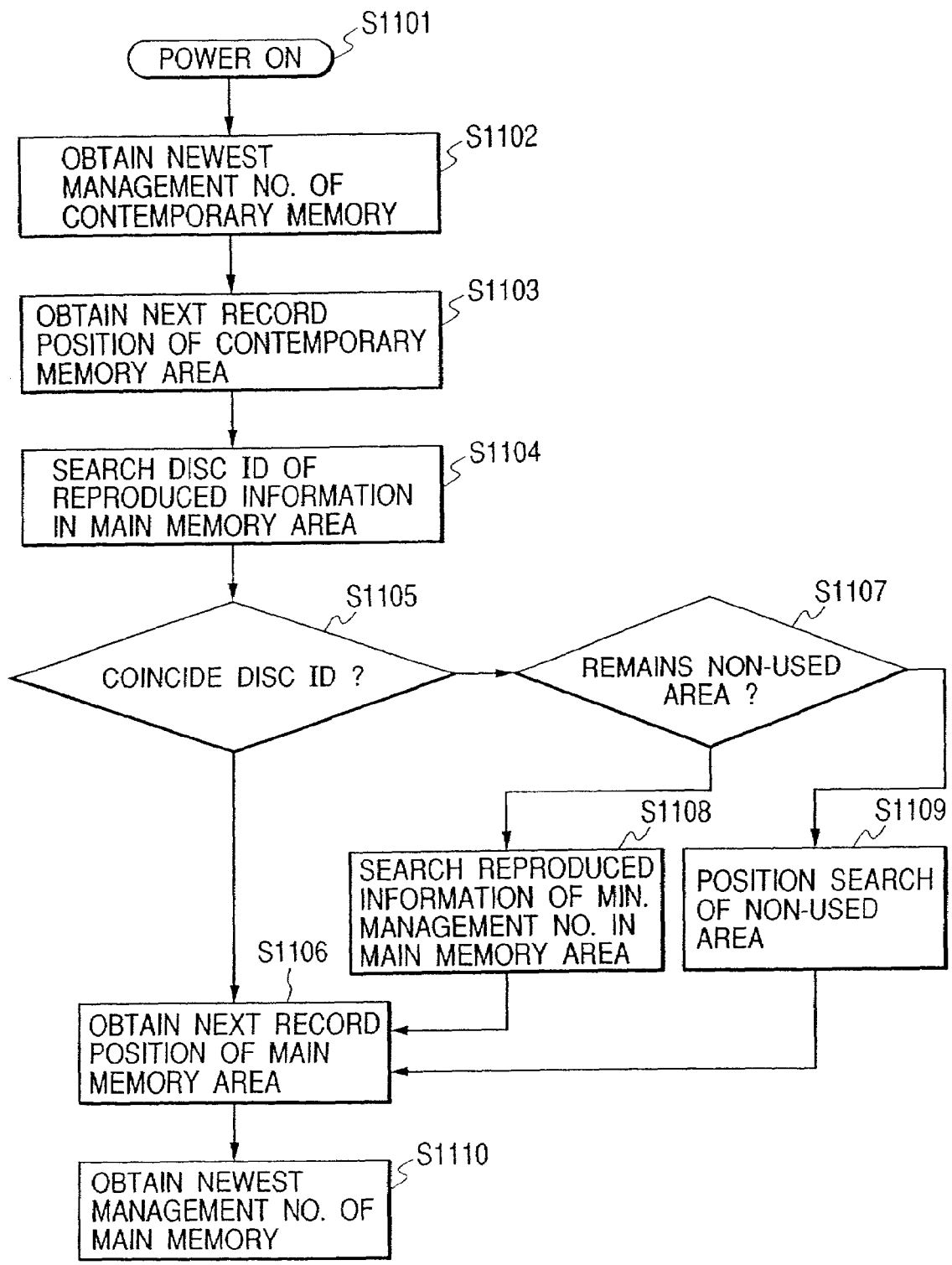

FIG. 11 shows a flow chart of indicating operations of the controller portion 6 when the electric power is ON. The flow will be explained by referring to a storing image of in the last memory shown in FIG. 12. When electric power is turned ON (S1101), the controller portion 6 searches the reproduced information 1202 having the maximum "management No. 0" from the contemporary memory area, and further obtains a next recording position P5 of the said reproduced information as a next contemporary memory position, by making the value 24 of the "management No. 0" of the said reproduced information as the newest contemporary "management No." (S1102 and S1103). Following to this, the controller portion 6 searches the reproduced information 1203 having the same disc ID to that of the reproduced information 1202 which was recorded into the contemporary memory area lastly (S1104). When the disc IDs are coincident to each other (S1104), the recording position P13 of it is obtained as a next recording position of the main memory (S1106). When there can be found no disc ID being coincident with it, a head or beginning position P14 of non-used area is obtained as the next recording position of the main memory (S1106, S1107 and S1109). Further, if there is no such the non-used area remained, the reproduced information having the minimum "management No. 1" among of those recorded in the main memory area, in other words, the storing position of the reproduced information which was stored in the main memory area at the earliest, is obtained as the next recording position in the main memory area (S1106 and S1108). Furthermore, the reproduced information having the maximum "management No. 1" among of those recorded in the main memory area, in other words, i.e., the reproduced information 1204 which was stored at the latest, is searched for, and is obtained as the newest management No. of the main memory, i.e., the "management No. 1" 5 in FIG. 12.

FIG. 13 shows an operation flow in the controller portion 6 after insertion of the disc. The writing processes into the last memory, in particular, when a certain disc is reproduced after turning electric power ON, will be explained by referring to FIG. 13.

When a certain disc is inserted into the drive apparatus 1a (S1301), the controller portion 6 obtains the disc ID of the said disc to compare it to the disc ID of the newest reproduced information in the above-mentioned contemporary memory area (S1302). If it is not coincident with or equal to that, the newest reproduced information of the above contemporary memory area is recorded at the next recording position in the main memory area obtained when the electric power is turned ON (S1303). At the time, the newest management No. of the main memory mentioned above, which is obtained when the electric power is turned ON, is incremented by one "1" to be recorded. At the same time, the controller portion 6 also records the newest management No. of the main memory into the work memory 3. In the case where the management No. exceeds "FFFFFFFF Hex", the reproduced information in the main memory are attached with the management Nos., starting from "0" in an increasing order from the less "management No. 1", again. The controller portion 6 further searches the reproduced information having the same disc ID to that of the inserted disc from the main memory area 802. When the disc IDs coincide to each other (S1304), the recording position is obtained as the next recording position in the main memory (S1305). If there is no such the disc ID coincident with it, the top position in the non-used area is obtained as the next recording position of the main memory (S1306 and S1308). Further, if there is no such the non-used area remained, the reproduced information having the minimum "management No. 1" among of those recorded in the main memory area, in other words, the storing position of the reproduced information which was stored in the main memory area at the earliest, is obtained as the next recording position in the main memory area (S1306 and S1307).

Here, the operation of the controller portion 6 when the disc is inserted will be explained by referring to FIGS. 12 and 14, in details.

Figure 4:
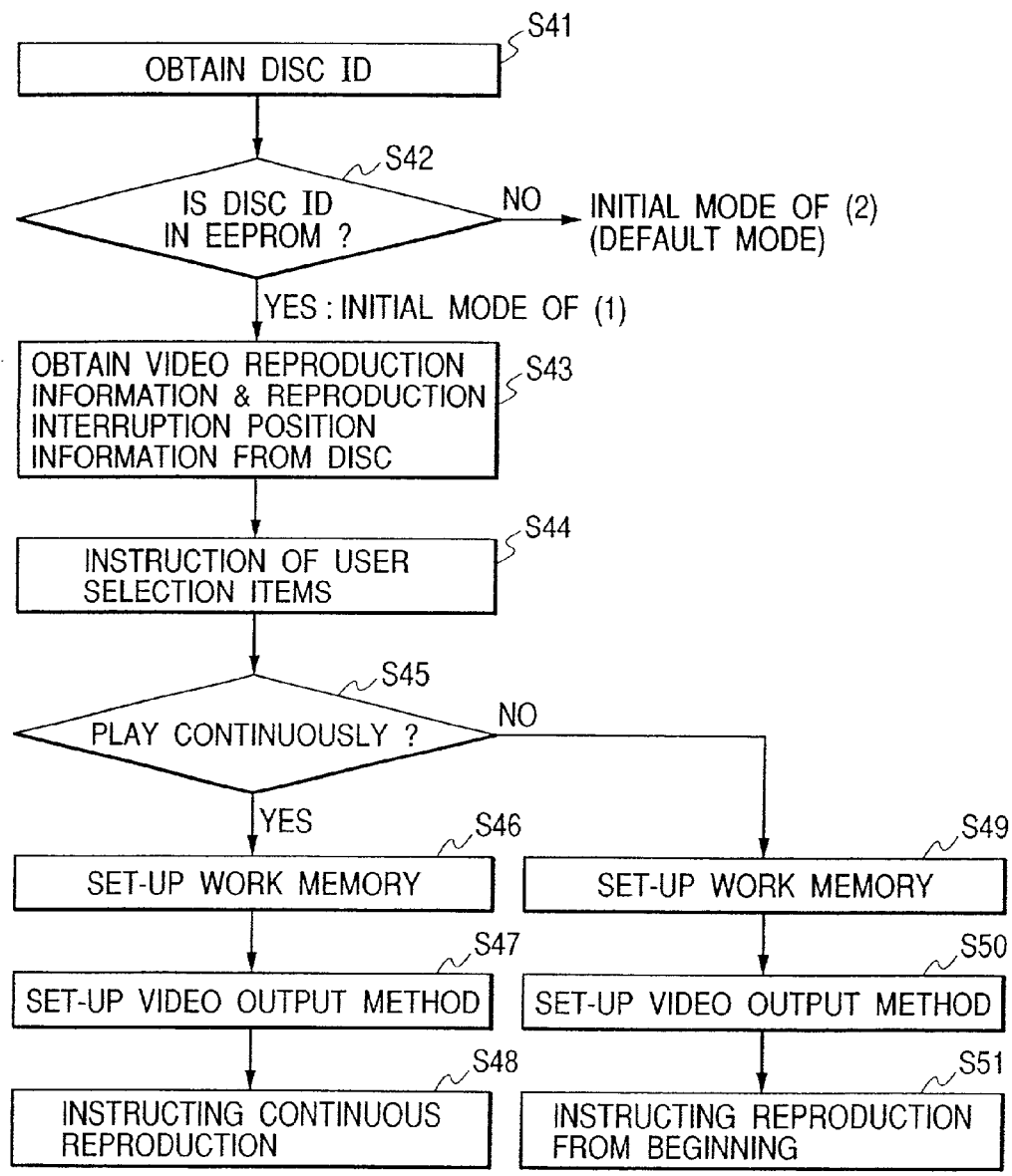
FIG. 4 shows an embodiment of an initial operation process flow in the reproducing apparatus of information recording media, in particular, an optical information recording medium, according to the present invention.

After being reproduced the disc of the disc ID 33 and recorded by the controller portion 6 up to the position P4 in FIG. 4, when the disc B of the disc ID 16 is inserted, the controller portion 6 obtains the disc ID 16 of the disc B which is newly set into the drive 1a to compare it to the disc ID of the reproduced information 1202 which was lastly recorded before the insertion of the disc. However, since it differs in the disc ID thereof, the reproduced information 1202 recorded at P3 in FIG. 12 is recorded at the next recording position P13 of the main memory. In this instance, the newest management number of the main memory of the "management No. 1" is renewed by incrementing by "1" in the value thereof, i.e., "6" to be recorded. Furthermore, the controller portion 6 searches the storing position of the reproduced information of the disc ID 16 from the main memory area, however, since no place can be found for storing the reproduced information of the disc ID 16, it obtains the beginning position P14 of the non-used area as the next recording position of the main memory. Here, the disc A is further reproduced, and after being recorded the reproduced information up to P1 as is shown in FIG. 14, if the disc A is inserted continuously, the controller portion 6 does not record it into the main memory area but records the reproduced information starting from P2 since the disc ID is same to that of the reproduced information 1402 which was lastly recorded before the insertion of the disc.

As is mentioned in the above, the last memory is divided into the contemporary memory area and the main memory area, and further the reproduced information is recorded rotationally while it is recorded into the main memory area only when the disc is exchanged, thereby enabling cutback the number in writing into the same position within the same EEPROM.

Furthermore, by managing the novelty of the reproduced information in the main memory area with use of the management No. 1, it is possible to record the latest reproduced information all the time.

What is claimed is:

1. A reproducing apparatus for reproducing recorded information recorded on an information recording medium, comprising:
    a drive for reproducing the recorded information from said information recording medium; and
    a non-volatile memory, which memorizes an identifier of said information recording medium loaded on said drive and position information indicative of a position on said information recording medium where said drive reproduces the recorded information therefrom,
    wherein said position information is renewed at one of a predetermined time and a predetermined period, in said non-volatile memory periodically; and
    wherein said non-volatile memory memorizes a plurality of said identifiers with each corresponding to a differing said information recording medium, and memorizes a plurality of entries of differing said position information for each identifier, where each entry of said plurality of entries is said position information for a differing instance of said predetermined time and said predetermined period.

2. A reproducing apparatus as defined in the claim 1, wherein said identifier and said position information are memorized in said non-volatile memory while maintaining correspondence therebetween.

3. A reproducing apparatus as defined in claim 1, wherein said position information is renewed at an automated one of the predetermined time and the predetermined period during reproduction of the recorded information.

4. A reproducing apparatus as defined in claim 1, wherein said position information is regularly renewed at an automated one of the predetermined time and the predetermined period during reproduction of the recorded information, irrespective of power maintenance and user intervention.

5. A reproducing apparatus as defined in claim 1, wherein upon restarting after power disruption, said drive is arranged to reproduce the recorded information from said information recording medium from a position corresponding said position information last renewed in said non-volatile memory periodically.

6. A reproducing method for reproducing recorded information recorded on an information recording medium, comprising:
    reproducing the recorded information from the information recording medium utilizing a drive; and
    memorizing in a non-volatile memory an identifier of the recording medium loaded on the drive and position information indicative of a position on the information recording medium where the drive reproduces the recorded information therefrom;
    wherein the position information is renewed at one of a predetermined time and a predetermined period, in said non-volatile memory periodically; and
    wherein said non-volatile memory memorizes a plurality of said identifiers with each corresponding to a differing said information recording medium, and memorizes a plurality of entries of differing said position information for each identifier, where each entry of said plurality of entries is said position information for a differing instance of said predetermined time and said predetermined period.

7. A reproducing method as defined in the claim 6, wherein the identifier and the position information are memorized in the non-volatile memory while maintaining a correspondence therebetween.

8. A reproducing method as defined in claim 6, wherein said position information is renewed at an automated one of the predetermined time and the predetermined period during reproduction of the recorded information.

9. A reproducing method as defined in claim 6, wherein said position information is regularly renewed at an automated one of the predetermined time and the predetermined period during reproduction of the recorded information, irrespective of power maintenance and user intervention.

10. A reproducing method as defined in the claim 6, wherein upon restarting after power disruption, reproducing the recorded information from said information recording medium from a position corresponding said position information last renewed in said non-volatile memory periodically.

* * * * *